(12) United States Patent
Dickerman et al.

(10) Patent No.: US 10,744,676 B2
(45) Date of Patent: Aug. 18, 2020

(54) CONCRETE MIXER AND CONTROLS THEREFOR FOR CONTROLLING DRUM ROTATION

(71) Applicant: Schwing America, Inc., St. Paul, MN (US)

(72) Inventors: James Dickerman, Mounds View, MN (US); Carl Phillip Quist, Maplewood, MN (US); Gary Heidger, Mounds View, MN (US); Clinton Martinez, Hugo, MN (US); Daryl Roehrich, Rogers, MN (US); Eric Seelnacht, Osceola, WI (US); Dang Thieu, Maple Grove, MN (US); Scott Roisum, Pine City, MN (US)

(73) Assignee: Schwing America, Inc., St. Paul, MN (US)

( * ) Notice: Subject to any disclaimer, the term of this patent is extended or adjusted under 35 U.S.C. 154(b) by 761 days.

(21) Appl. No.: 15/267,969

(22) Filed: Sep. 16, 2016

(65) Prior Publication Data

US 2017/0080600 A1 Mar. 23, 2017

Related U.S. Application Data

(60) Provisional application No. 62/220,772, filed on Sep. 18, 2015.

(51) Int. Cl.
*B28C 5/42* (2006.01)
*B60P 3/16* (2006.01)

(52) U.S. Cl.
CPC ............ *B28C 5/422* (2013.01); *B28C 5/4272* (2013.01); *B60P 3/16* (2013.01)

(58) Field of Classification Search
CPC .......... B28C 5/422; B28C 5/4272; B60P 3/16
See application file for complete search history.

(56) References Cited

U.S. PATENT DOCUMENTS

| | | | |
|---|---|---|---|
| 4,097,925 A * | 6/1978 | Butler, Jr. | ................. B28C 5/42 366/2 |
| 5,713,663 A | 2/1998 | Sandberg et al. | |
| 6,286,987 B1 * | 9/2001 | Goode | ................. B28C 5/4206 123/352 |
| 6,484,079 B2 | 11/2002 | Buckelew et al. | |

(Continued)

FOREIGN PATENT DOCUMENTS

| | | | |
|---|---|---|---|
| EP | 1820692 A1 | 8/2007 | |
| GB | 2435225 A * | 8/2007 | ............. B28C 5/422 |

(Continued)

OTHER PUBLICATIONS

Machine Translation of JP 2014-4769 (Year: 2014).*
International Search Report and Written Opinion issued in PCT/US2016/052235, dated Jan. 3, 2017, 12 pages.

*Primary Examiner* — Charles Cooley
(74) *Attorney, Agent, or Firm* — Faegre Drinker Biddle & Reath LLP

(57) ABSTRACT

A concrete mixing system includes a vehicle, a rotatable mixing drum coupled to the vehicle, an incline and/or slump sensor, and a controller. The controller is configured to effect a change of rotational speed of the rotatable mixing drum in response to a signal from at least one of the sensors indicating an increased likelihood of spillage of concrete from the rotatable mixing drum.

14 Claims, 6 Drawing Sheets

(56) References Cited

U.S. PATENT DOCUMENTS

| | | | |
|---|---|---|---|
| 6,611,755 B1 | 8/2003 | Coffee et al. | |
| 6,938,716 B1* | 9/2005 | Eull | B28C 5/4206 |
| | | | 180/282 |
| 7,722,243 B2 | 5/2010 | Schumacher et al. | |
| 8,118,473 B2* | 2/2012 | Compton | B28C 5/422 |
| | | | 366/17 |
| 8,746,954 B2* | 6/2014 | Cooley | B28C 5/422 |
| | | | 366/143 |
| 8,764,272 B2* | 7/2014 | Hazrati | B28C 7/026 |
| | | | 366/142 |
| 9,518,870 B2* | 12/2016 | Verdino | G01K 1/024 |
| 2005/0004733 A1* | 1/2005 | Pillar | B28C 5/4206 |
| | | | 701/48 |
| 2007/0247964 A1* | 10/2007 | Ross | B28C 5/4206 |
| | | | 366/61 |
| 2007/0263478 A1* | 11/2007 | Burch | B28C 5/4213 |
| | | | 366/61 |
| 2008/0144424 A1* | 6/2008 | Schumacher | B28C 5/422 |
| | | | 366/3 |
| 2009/0171595 A1* | 7/2009 | Bonilla Benegas | B01F 15/00207 |
| | | | 702/41 |
| 2014/0104066 A1* | 4/2014 | Jordan | G08B 21/20 |
| | | | 340/606 |
| 2015/0142362 A1* | 5/2015 | Jordan | G01C 19/02 |
| | | | 702/96 |
| 2017/0028586 A1* | 2/2017 | Jordan | B28C 7/026 |
| 2017/0080600 A1* | 3/2017 | Dickerman | B28C 5/422 |
| 2017/0217047 A1* | 8/2017 | Leon | B28C 7/024 |
| 2017/0361492 A1* | 12/2017 | Datema | B28C 5/4217 |
| 2019/0344475 A1* | 11/2019 | Datema | G06Q 50/08 |

FOREIGN PATENT DOCUMENTS

| | | | |
|---|---|---|---|
| JP | 2014-4769 | * | 1/2014 |
| JP | 2014004769 A | | 1/2014 |

* cited by examiner

CONCRETE MIXER AND CONTROLS THEREFOR FOR CONTROLLING DRUM ROTATION

CROSS-REFERENCE TO RELATED APPLICATION

This application claims the benefit of priority to U.S. Provisional Application No. 62/220,772, filed Sep. 18, 2015, which is hereby incorporated by reference in its entirety.

BACKGROUND

Concrete mixers are used to mix the ingredients that typically include cement, sand and/or gravel and water and maintain the mixture in a fluid state up to and including the placement of the concrete in the desired location. Control of the mixer is used in an effort to maintain the mixture as desired.

Mixers can be standalone units or mounted on a vehicle such as a truck with a placement chute or boom. When mounted on a vehicle, the mixer movement and the concrete mixture in the mixer are components of the forces applied to the vehicle when stationary or when moving.

SUMMARY

One embodiment relates to a concrete mixer vehicle having a vehicle front portion and a vehicle rear portion. A rotatable mixing drum is coupled to the vehicle and having a drum first end portion and drum second end portion. The drum first end portion can have a discharge opening to permit discharge of concrete at a work site. An incline sensor can be configured to sense an indication of an incline of at least one of the vehicle front portion relative to the vehicle rear portion and of the drum first end portion relative to the drum second end portion.

In another embodiment, the incline sensor can include an inclinometer, altimeter, and GPS device. The vehicle can be configured such that the discharge opening is closer to the vehicle rear portion than the vehicle front portion or configured such that the discharge opening is closer to the vehicle front portion than the vehicle rear portion.

In another embodiment, a controller can be configured to receive a signal from the incline sensor corresponding to the incline of at least one of the vehicle front portion relative to the vehicle rear portion and of the drum first end portion relative to the drum second end portion, and configured to effect a change of rotational speed of the drum based on the signal from the incline sensor.

In another embodiment, the controller is configured to increase the rotational speed of the drum in a charge rotational direction when the sensed incline of at least one of the vehicle front portion relative to the vehicle rear portion and the drum front portion relative to the drum rear portion exceeds a set amount to avoid discharge of concrete from the drum.

In another embodiment, the controller can include at least one of a programmable logic controller and a computer. The incline sensor can include one of an inclinometer, altimeter, and a GPS device. The controller can be configured to receive a signal from the incline sensor and to effect a change of rotational speed of the drum based on the signal from the incline sensor.

In another embodiment, a slump sensor can be configured to detect slump of concrete in the drum. The controller can be configured to receive a signal corresponding to the sensed slump from the slump sensor and to effect a change of rotational speed of the drum based on the signal from the slump sensor and the signal from the incline sensor.

In another embodiment, at least a third sensor can be configured to detect an aspect of at least one of the vehicle and the concrete in the drum other than incline or slump. The controller can be configured to effect the rotational speed of the drum based on signals from the incline sensor, slump sensor, and the third sensor.

In another embodiment, the third sensor is one of a drum speed sensor, vehicle speed sensor, acceleration sensor, position sensor, pressure sensor, and RFID sensor.

In another embodiment, a change of rotational speed of the drum includes at least one of a change of speed of the drum and a change of direction of the drum.

In another embodiment, various means are used to carry out various functions using noted structures and their equivalents. For example, a means for communication can be a one-way or two-way communication module or system. This means can include at least one of a corded communication device, a wireless communication device, a fixed communication device, and an in-cab device. Any of the corded, wireless or fixed communications devices can be positioned at the rear portion of the vehicle, or at other portions.

Another embodiment is a communication means that enables at least one of communicating a checklist, completion of a checklist, data relating to the vehicle, data relating to the concrete in the drum, an alert, a malfunction, a recommendation to carry out maintenance of an aspect of the vehicle, a recommendation regarding the concrete, a change to at least one aspect of the vehicle, a batch report, mixer drum RPM, drum revolutions, hydraulic fluid temperature, hydraulic system pressure, load size outputs, load size inputs, maintenance issue notifications, maintenance checklists, customer signature, and customer confirmation of order.

Another embodiment is a concrete mixer vehicle having a vehicle front portion and a vehicle rear portion and a rotatable mixing drum coupled to the vehicle and having a drum first end portion and drum second end portion. The drum first end portion can have a discharge opening to permit discharge of concrete at a work site. A slump sensor can be configured to sense slump of concrete in the drum. A controller can be configured to receive a signal from the slump sensor corresponding to the slump of concrete in the drum and configured to effect a change of rotational speed of the drum based on the signal from the slump sensor.

Another embodiment is a concrete mixer with at least a second sensor configured to detect an aspect of the vehicle, and wherein the controller is configured to affect the rotational speed of the drum based on signals from the slump sensor and the second sensor.

Another embodiment includes a concrete mixer vehicle having a vehicle front portion and a vehicle rear portion and a rotatable mixing drum coupled to the vehicle and having a drum first end portion and drum second end portion. The drum first end portion can have a discharge opening to permit discharge of concrete at a work site. At least two sensors can be configured to sense at least one of an aspect of the mixer vehicle and the concrete in the drum. A controller can be configured to receive a signal from each of the at least two sensors and configured to effect a change of rotational speed of the drum based on the signals.

Another group of embodiments includes methods for making or using an embodiment of a concrete mixer vehicle or any of the aspects of a vehicle disclosed herein, including any and all those in the previous paragraphs and/or in the Detailed Description.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1A:
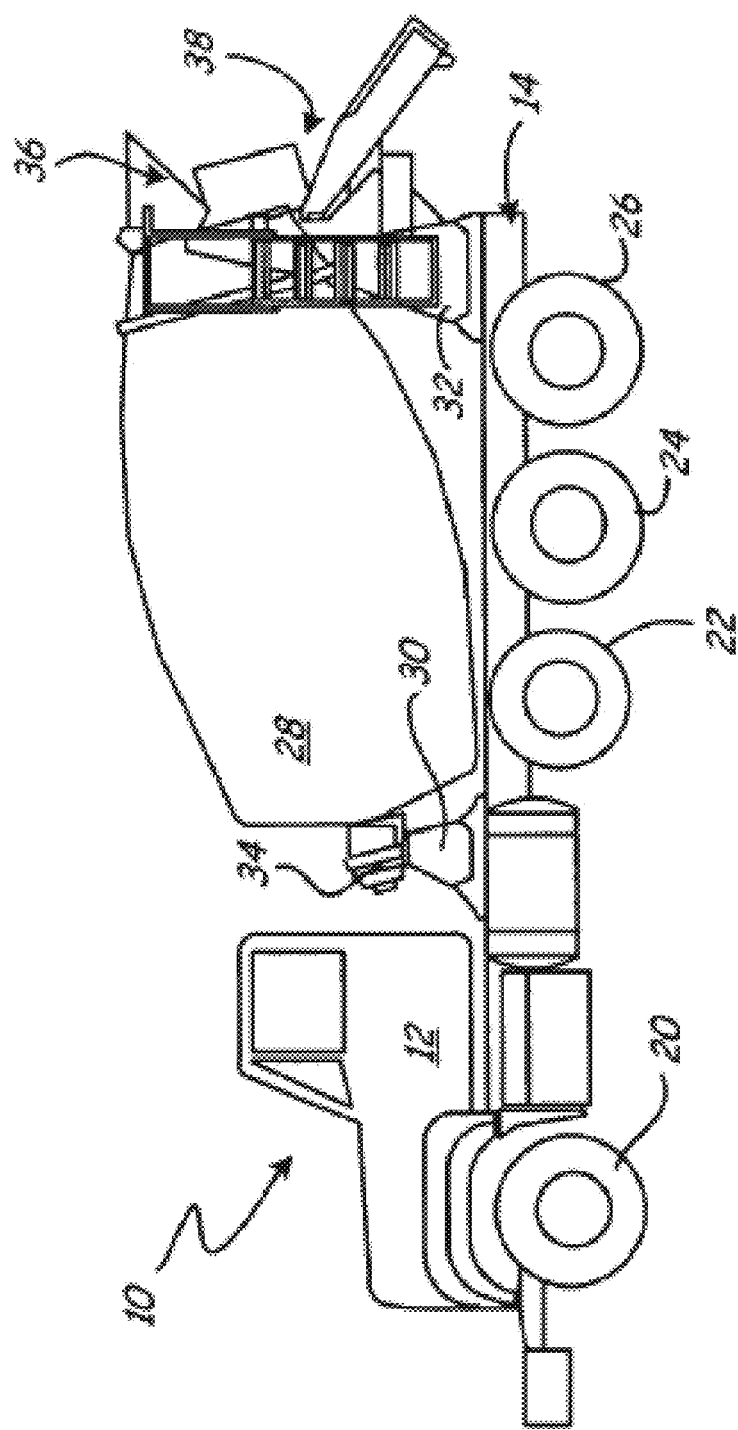
FIG. 1a is a side view of an illustrative embodiment of a concrete mixer truck.

While the subject matter disclosed herein is amenable to various modifications, equivalents, different combinations and permutations of disclosed aspects or features and alternative forms, specific embodiments have been shown by way of example in the drawings and are described in detail below. The disclosed subject matter, however, is not limited to the particular embodiments described or shown. On the contrary, the disclosure is intended to cover all modifications, equivalents, combinations, permutations, and alternatives falling within the ambit of the subject matter disclosed herein.

DETAILED DESCRIPTION

This disclosure describes and enables multiple embodiments and is to be understood to describe and enable additional embodiments that contain fewer or more specific features than those shown in the other embodiments, or that contain different combinations or permutations of specific features noted within any of the embodiments.

One specific embodiment is shown in FIG. 1a, which is a side view of a concrete mixing truck 10. In this embodiment, truck 10 includes cab 12, chassis 14, wheels 20, 22, 24 and 26 (with wheels on the other side of truck 10 not being shown), drum 28, drum front support or pedestal 30, drum rear support or pedestal 32, drum drive 34, discharge opening 36, chute 38, and a control system including controller 40 (not shown in FIGS. 1a-c; see FIG. 2 and associated text herein). Truck 10 as shown in the figures has a front, rear and side portions, with the discharge end of drum 28 being at or nearer the rear portion of truck 10. It is understood that other configurations of trucks can be used with the subject matter disclosed herein, including a configuration in which the discharge end is at or nearer the front portion of truck 10. Truck 10 is available from Schwing America Inc. (see content in www.schwingamerica.com and www.schwing.de; Schwing America is located in 5900 Centerville Road, Saint Paul, Minn.).

Mixer drum 28 holds and mixes concrete, that is, drum 28 provides means for holding and mixing concrete. Mixer drum 28 is supported by chassis 14 between front support or pedestal 30 and rear support or pedestal 32, that is, front pedestal 30 and rear pedestal 32 each provide means for supporting mixer drum 28. Rear pedestal 30 in this embodiment has a greater height than front pedestal 32, so that the rear of drum 28 is elevated relative to the front of the drum 28. Drum drive 34 or means for driving the drum can be a hydraulic drive and can rotate drum 28 in a charge direction to mix the concrete while truck 10 is traveling to, for example, the work site or while the truck is stationary. When truck 10 is in position at the work site and deliver of the concrete is desired, the driver can cause drive 34 to reverse the rotation of drum 28 so it rotates in the discharge direction. As the drum rotates, the fins (not shown) within drum 28 move the concrete toward discharge opening 36. The concrete is delivered out of drum 28 through discharge opening 36 and down chute 38.

Drive 34 can be driven by a driving means such as a power take-off (not shown) from the engine (not shown) of truck 10. U.S. Pat. No. 7,722,243 discloses more detail regarding drives, controls and other aspects of mixer trucks, which is incorporated in its entirety herein. As engine speed varies, the input from, for example the power take-off, to drive 34 changes speed, which can result in a change in the speed of rotation of drum 28. Alternatively, a control system can engage drive 34 to operate at a different speed than if dependent upon the power take off, that is, a drive speed control means. The control system, which can for example include a controller such as a programmable logic controller or computer having memory that contains programming and further includes a communication module, receives a signal representative of sensed vehicle speed, and compares that speed to a threshold value. (The control system and controller are described further herein.) When the sensed vehicle speed (such as the RPMs of an axle, shaft, gear or other portion of the vehicle or the sensed speed of the ground or other stationary surface or structure moving relative to the vehicle) is greater than the threshold, the control system engages drive 34. Drive 34 can be, for example, a hydraulic drive, and can be used to operate at a constant speed. The speed of rotation of drum 28 in a constant drum speed mode can be set high enough to keep the payload within drum 28 in motion and not so high to unnecessarily reduce the usable life of the drum and fins, incur unnecessarily high energy costs or provide a truck engine with significantly more horsepower for excessive drum rotational speed. The rotational speed in the constant drum speed mode in one embodiment can be at about or less than 2 revolutions per minute (rpm), and in another embodiment can be at about 1 revolution per minute.

Figure 1B:
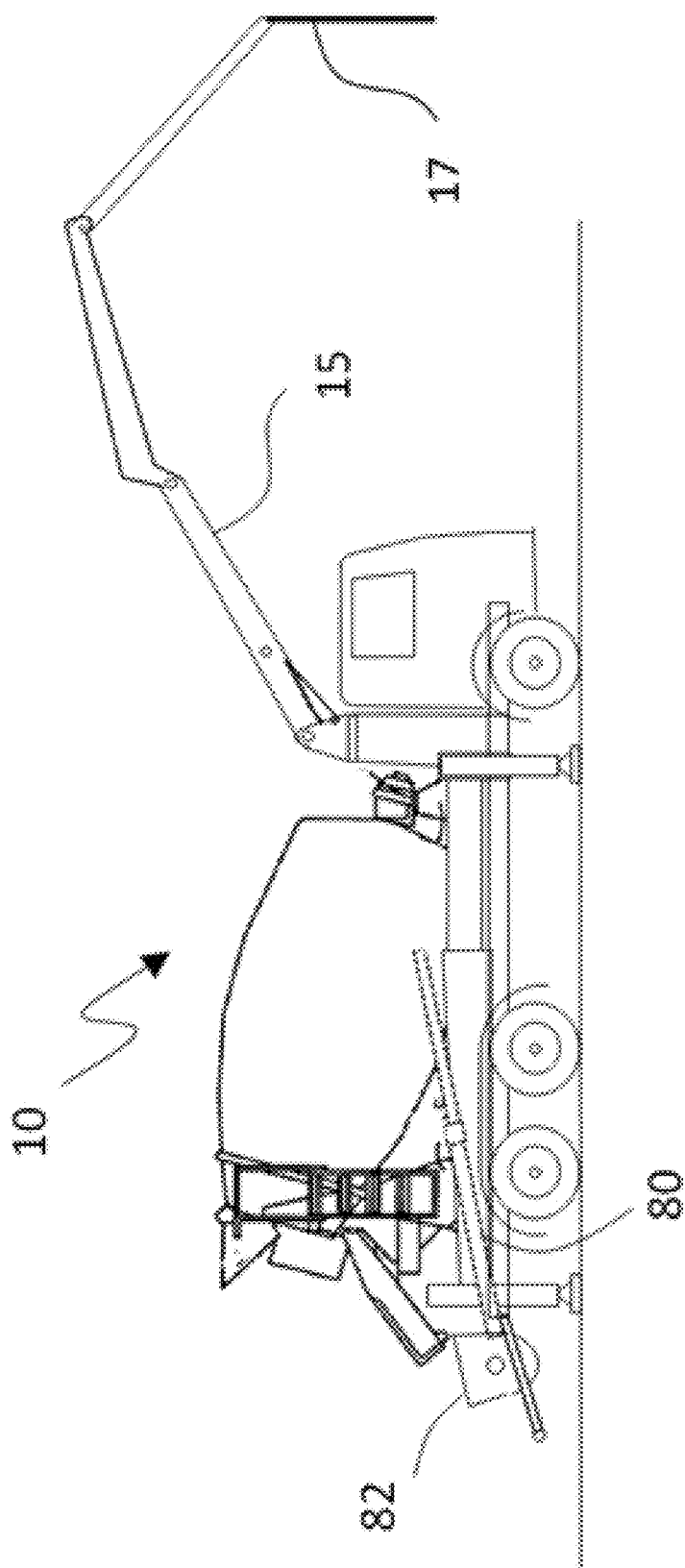
FIG. 1b is a side view of an illustrative embodiment of a concrete mixer truck including a concrete pump and a concrete distribution boom.

FIG. 1b is a side view of a concrete mixer truck 10 similar to the embodiment shown in FIG. 1a. The truck 10 includes an integrated concrete pump 80 with a hopper 82 and a concrete distribution boom 15. When concrete is discharged from the drum 28 the concrete slides on or through the chute into the hopper 82, from where the concrete pump 80 receives the concrete and pumps it with high pressure in a concrete pipe (not shown). The concrete flows through the concrete pipe, which is mounted along the concrete distribution boom 15, until it finally drops out through an end hose 17 at the construction site.

Figure 1C:
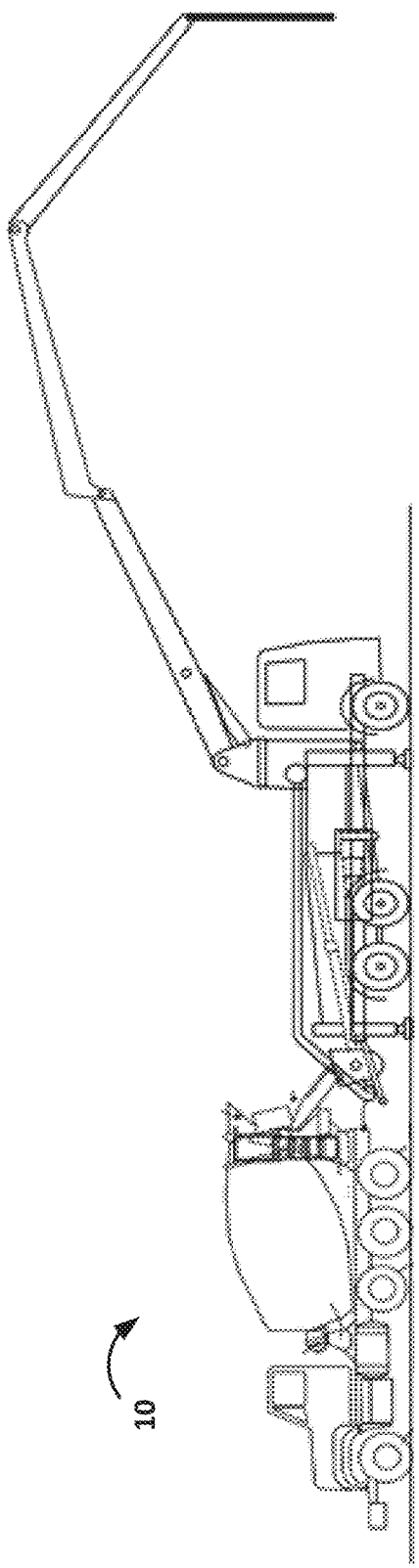
FIG. 1c is a side view of an illustrative embodiment of a concrete mixer truck and a concrete pump truck with a concrete distribution boom.

FIG. 1c is a side view of the concrete mixer truck 10 similar to the embodiment shown in FIG. 1a, arranged with its rear side to the rear side of a concrete pump truck with a concrete distribution boom. Concrete mixer truck 10 delivers the concrete to the hopper of the concrete pump truck and from the hopper the concrete is pumped with the concrete pump into the concrete pipe and then along the concrete distribution boom to the construction site as described above.

Figure 2:
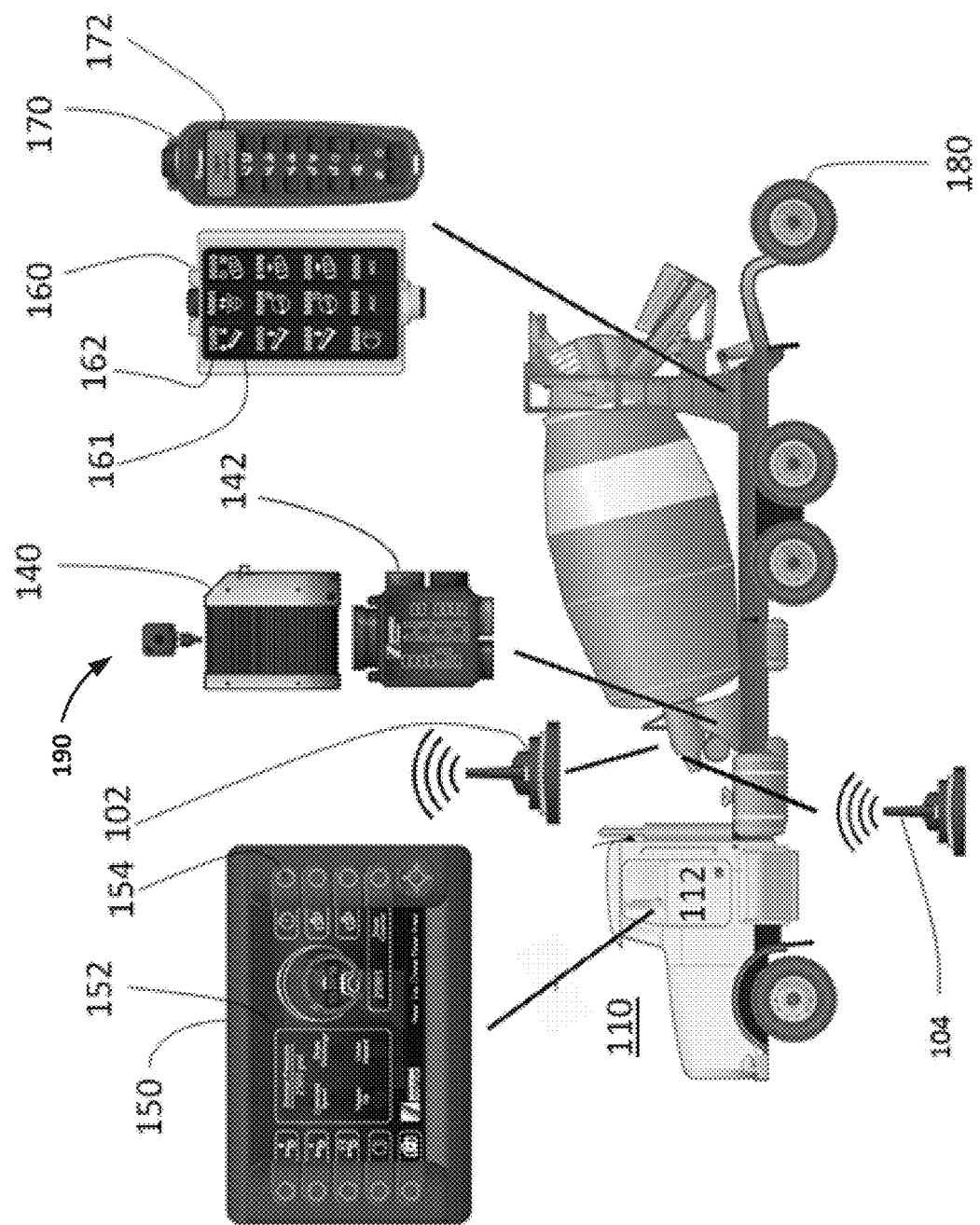
FIG. 2 is a side view of another embodiment of a truck that is similar to the truck of FIGS. 1a, 1b, and/or 1c, which shows enlarged views of components that are part of the truck.

FIG. 2 is a side view of a truck 110 that is similar to truck 10 shown in FIGS. 1a, 1b and/or 1c. FIG. 2 also provides views of certain components of truck 110, which are shown enlarged and separated from the truck 110 for illustrative purposes. Lines are shown merely to indicate the location of the components in or on the truck. For example, a control panel 150 is shown located within the cab 112 of truck 110 for the driver to view and use. Further the truck 110 of FIG. 2 contains a booster axle 182 at the far rear of truck 110 for better distributing the weight of the truck on the street while traveling to the construction site with concrete loaded in the drum, but which needs to be lifted for concrete discharge at a construction site.

Controller 140, such as a programmable logic controller or computer (which can have or be connected to memory, programming, and communication module) and fuse and relay panel 142 are shown located and housed in the mid portion of the truck 110. Controller 140 (like controller 40 in FIG. 1) is the or part of the control system that can receive data (e.g., information, signals, the like) and can store and process the software, logic and/or code used to control aspects of the truck 110 such as the drum rotational speed and other aspects as described herein. It can do so using the received data. Controller 140 can be wired to control panel 150 or wirelessly connected to it through known wireless communication componentry. Controller 140 might comprise a CAN-bus interface or other type of communication interface protocol, enabled to communicate with a J1939 network, which is a generally known vehicle control network so that vehicle data can be pulled by the controller 140 of or from the truck mixer J1939 network and/or the ECU (Electronic Control Unit) of the truck to determine e.g. vehicle speed and can be linked with the mixer control system. Further controller 140 might be enabled to control engine data, e.g. for increasing the motor engine speed of the truck in case more power is needed for driving the mixing drum. The term controller is used herein to refer to above specific embodiments and also to other control arrangements, components, assemblies, and the like.

Figure 4:
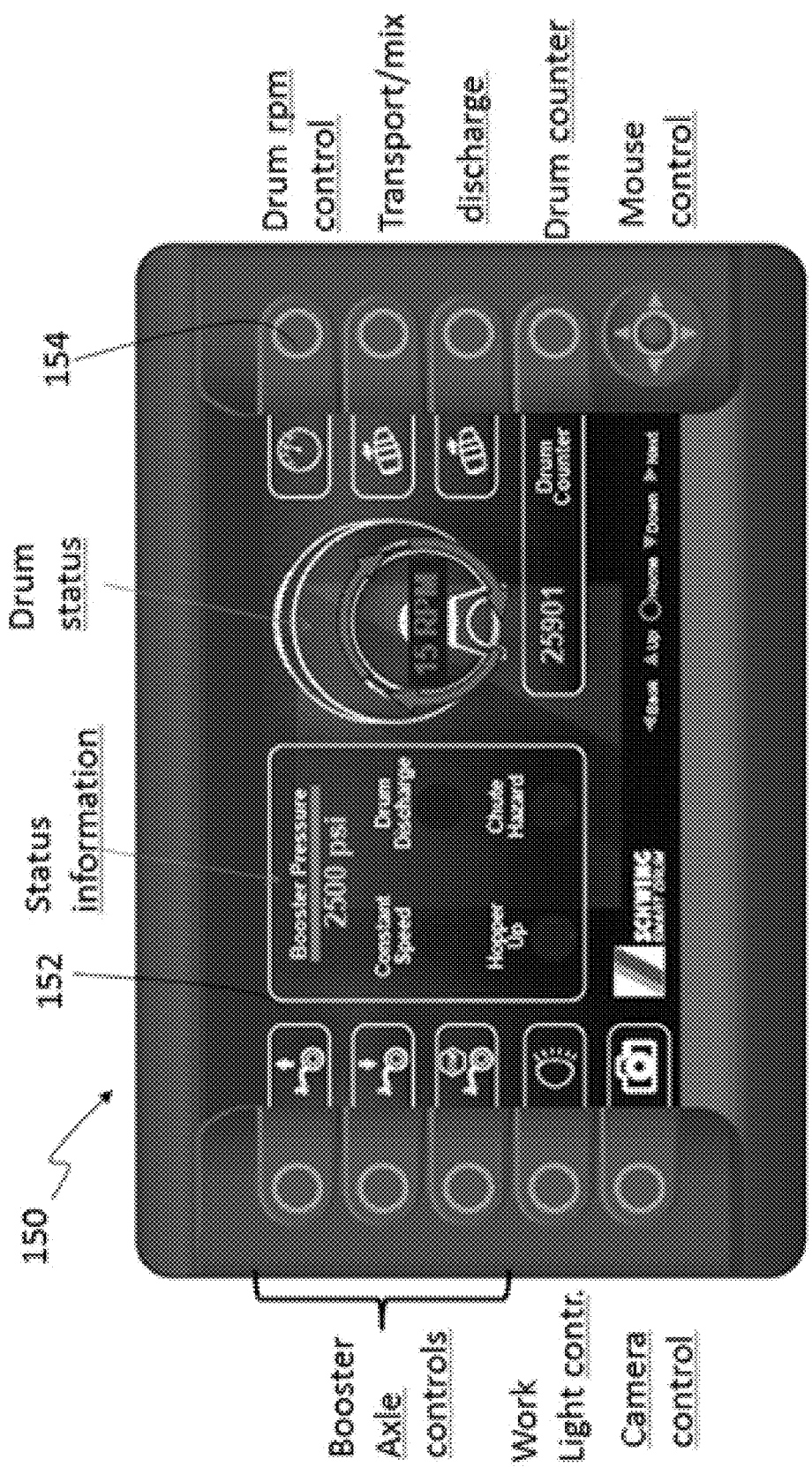
FIG. 4 is a view of a control panel according to one embodiment of the invention.

Control panel 150, which is shown in more detail in FIG. 4 might be equipped with a touchscreen 152 only and fully operated with the fingers or a stick by the operator. Control panel 150, as shown in FIG. 4 includes a display 152 in connection with softkeys 154 at the sides of the display, which change their functionality when going through the various operating menus of the system. In machine environments like a truck mixer, where an operator often wears work gloves, the operation by softkeys could be used in place of a pure touchpad operation (though touchpad operation can be employed in the disclosed embodiments and can a mixture of touchpad/screen display and softkeys).

Corded control device 160 and wireless control device 170 are shown located at the rear of the truck 110. Corded control device 160 might be located at a fixed location but could be fixed releasably attached in a holder and when an operator releases the corded control device from the holder it stays in electrical contact with the truck mixer through a helical cable, so that the operator can move around with the corded control device for better surveying the machine operation. Either or both device 160 and device 170 can provide a communication capability, such as one-way or two-way communication by, for example, having transmitter and receiver components. Bluetooth™, WLAN or any other standard could be used for shorter range communication. For example, the operator of the mixer truck 110 can use either device 160, 170 to control the mixer drum. In FIG. 2 wireless control device 170 is equipped with a display screen 172 but also the corded control device might be equipped with a display screen so that either or both devices 160, 170 can display the truck mixer control system outputs such as the mixer drum RPM, drum revolutions, hydraulic fluid temperature, hydraulic system pressure, load size outputs, load size inputs, maintenance issue notifications, safety checklists, maintenance checklists, customer signature, and customer confirmation of order, all of which can be stored in the controller 140. In some embodiments, wireless device 170 is a cell phone or tablet with an app that provides an interface that displays and enables control of the above-mentioned mixing and truck parameters. Corded control device 160, as shown exemplary in FIG. 2, contains operation keys 161 with control lamps 162 which can change their color and/or switched on and off separately. This way the operator can see the status of the controlled devices from the operation keys 161. Instead of physical keys, wireless and corded control device 160, 170 might be equipped with a touchscreen. In addition to or in place of either devices 160, 170, a device with the same or similar capabilities can be fixed to the truck 110 (i.e., not corded or intended to be separated from the truck when used) such that an operator would use it when standing by the truck; it could be either hardwired directly or indirectly to the controller 140 and/or other components or wirelessly in communication with them.

The shorter range transceiver 102 can be configured to or provide a means for communication with the devices located on or near to the mixer truck, so that e.g. the operator of wireless control device 170 can control mixer functions and other truck functions from a location where the operator can be carrying out other tasks or where environmental conditions for the operator are different from conditions at the rear of truck 110. Such control and communication devices are commercially available from a variety of known sources.

The mixer truck 110 may be additionally equipped with a longer range wireless transceiver 104 (e.g., operating with a cellular phone standard like GSM, UMTS, LTE and the like) for communication with a batch plant control system, a customer to whom concrete is delivered, the concrete truck mixer base or any other offsite server/system. Transceivers 102 and 104 might not be separated but rather integrated into one device. Transceivers 102 or 104 might also be used to exchange communication signals with the concrete pump truck with distribution boom of FIG. 1c during the concrete placement for aligning the concrete discharge rate from the truck mixer 110 with the concrete pumping speed of the concrete pump.

Either or both devices 160, 170 and/or control panel 150 and variations thereof can be used by the operator to go through a checklist which can be loaded in controller 140. The operator can select and verify items within the checklist. The prior selections made by the operator and the available options or selections to be made by the operator can be displayed on the screen of either or all of device 160, 170 and/or control panel 150. A batch plant output or data set can also be loaded into any of device 160, 170 and/or control panel 150 and transmitted to the customer such that the customer can confirm the output by sending back a communication signal to the devices 160, 170, control panel 150, the controller 140 or another component of the truck 110 having a data storage, or to a data storage device separate from the truck 110 such as at an offsite server or other data storage device. The customer's signal could effectively be something like: "Confirmed," "Approved," or "Not Confirmed" or "Not Approved." After a customer confirmation or approval has been received, a communication containing an invoice can be sent to the customer. This could be done manually or automatically through any of the devices 160, 170, the control panel 150, the controller 140 or another communication device of the truck 110 or a device located off the truck, such as the previously noted server.

Similarly, either device 160, 170 or the control panel 150 (or other variations mentioned herein) can transmit select data from the two-way communication to a desired location for data processing. Still further, the communications described herein can also be one-way, for example, from the devices described herein to a desired location. Examples of select data being communicated include slump readings; engine rpms; drum revolutions; oil/fluid temperature; oil/fluid overheat or high temperature instances and duration (for example, being based off of operational manual information); additions of water to the load; water volume status in water tank; water temperature in water tank for example to prevent freezing; maintenance data including total number of drum revolutions, hours of operation or other metrics, such that after a particular number is reached, the rollers for example could be replaced to avoid failing and the maintenance team or maintenance programming could be effectively alerted to order parts and have the parts installed, or such that standard operation items are checked based on the particular number reached.

Other data/information that could be transmitted using such devices is ticket/load data from the batch plant, including the addition of water on site, customer signature, customer contact information, number of mix revolutions, slump reading for theoretical slump. And for example, when the total mix revolutions for a load reaches, for example, 300 revolutions (note American Concrete Institute standards regarding mix revolutions) or approaches 300 revolutions such as at 50, 100, 150, 200, and 250 revolutions (or at a larger or smaller increments or at different numbers), this data can be captured and/or used to alert the appropriate person(s).

Captured data could also be used in conjunction with Department of Transportation or intracompany drive inspections and confirmations of checklist. In some embodiments, the above-described checklists can be viewed and utilized on displays of device 160, 170. Other examples of captured data including drum rotation direction(s), part or all of the load sequence (such as the batch, drive to job, discharge at job, clean up, return to plant) so the ready mix operation knows the status of the truck/load from the mixer controller rather than a separate system. Still other captured data or information can be in the form of images or image data from cameras, which could be sent to the ready mix operation for analysis including operator performance and/or training.

In addition, device 160, 170 or the control panel 150 can provide communication, coordination and/or feedback between or involving the mixing of the concrete and the pumping of the concrete for truck 110, which include both mixing and pumping systems as shown in FIG. 1*b*, or for a mixer truck that does not include a pumping system but is configured to work in conjunction with a separate pumping device, such as a truck-mounted concrete pump as shown in FIG. 1*c*. For example, if controller 140 received a signal from device 160, 170 or panel 150 to turn off concrete pump 180, then controller 140 could, via its programming, send a signal that stops or slows the rotation of the mixer drum 128.

For example, if controller 140 received a signal from device 160, 170 or panel 150 to turn off concrete pump 180, then controller 140 could, via its programming, send a signal that stops or slows the rotation of the mixer drum 128. This could prevent or reduce overfilling the hopper 182 and air entering the concrete pump 180.

As noted, either or both corded control device 160 and wireless control device 170 can be used to control one or more of the mixer functions from the rear of the truck 110 (as compared to control panel 150 that can be used to control one or more of the mixer functions from within the cab of truck 110). Not shown but understood is a communication cord or cable that connect corded control device 160 to controller 140. Either device 160, 170 can include a display, such as a liquid crystal display, that can for example show settings for and readings of functions of truck 110 including those for one or more of the mixer functions and pump functions. Each device 160, 170 can also, as previously noted, include a transmitter and receiver that allow a user to communicate with controller 140, control device 150, other parts of truck 110. Specifically regarding wireless control device 170, it can be configured to have a communication range with the controller 140 and other such devices, of approximately 10 meters, 50 meters or other ranges. In case the wireless device 170 is equipped with a long range radio transceiver it might also communicate with components, servers, and other devices and systems remote from truck 110.

Wireless control device 170 might also be enabled to store checklist data or any other kind of data which is wirelessly received from controller 140 or in any other way. The wireless control device 170 might then be taken physically to a batch plant operation system or a customer data terminal which is also equipped with a shorter range communication functionality, so that the data from the storage of the wireless control device 170 can be exchanged also with more distant devices without having long range communication capabilities.

Truck 110 (as well as truck 10 and other truck embodiments) can also include various other components, systems, subsystems, assemblies and subassemblies. For example, truck 110 can include a hydraulic system, various engine control components, chute control mechanics such as a joystick in communication with one or more actuators for moving the chute, a GPS system, sensors, actuators, and additional communication and/or control devices. For example, truck 110 can include incline sensor 190 such as an inclinometer, altimeter, GPS sensor, etc., or a plurality of such sensors, each of which can be used to sense, detect and/or measure the degree of incline of an aspect of truck 10, 110 or another truck (or drum 28, 128 or other drum of a truck).

An incline sensor 190 could be positioned or configured to sense, detect or measure incline of truck 110 or its drum from the front to its back or the truck or drum, such as when truck 110 is traveling up or down a hill or is parked on a hill. A sensed or detected degree of incline can be used to manually or automatically adjust the RPM of mixer drum. For example, when the mixer opening is at the back of the truck and the truck is inclined such that the back is lower than the front and concrete can spill from the mixer, a signal from the incline sensor 190 to the controller 140 can cause the mixer RPM to be increased to prevent or reduce any spillage. Conversely, a detected change in inclination in the opposite direction, such as when truck 110 is going down a hill or is parked with the front of truck 110 facing downhill, could be used to cause a decrease in the rotation speed of mixer drum. For example, incline sensor 190 could take an incline degree reading and the controller 140 could compare it to the slump reading, for example, the hydraulic pressure and adjust the drum speed depending on these inputs to prevent spillage of concrete. In some embodiments, controller 140 could be configured to access the vehicle network for fetching data from a GPS sensor, which could be used for a navigational system of the truck or a position determination. Because a GPS sensor is able to provide horizontal and vertical position information, controller 140 could determine the incline of the truck from the GPS data while travelling. Further truck engine data can be taken into account, e.g. high current fuel consumption, in connection with constant or declining truck speed can indicate an incline of the street. Truck speed might also be determined from wheel sensors, which are generally used by vehicles today for stabilizing the driving vehicle or determining vehicle position where no GPS satellite system is available (e.g. in tunnels). Various other methods for determining an incline without a separate incline sensor could be possible.

Still in another embodiment, an incline detector or sensor 190 could be positioned to detect an incline of the truck in the side-to-side direction. When a sufficient angle of incline is detected, the controller 140 could cause the drum speed to reduce or stop or even cause the drum 28 to reverse in direction. This could be used to shift the center of gravity of the load for more stabilization of the mixer truck and/or to reduce spillage, particularly when the incline is in a direction that coincides with the internal drum fin configuration that would create more risk of spillage than if the incline were in the opposite direction.

Truck 110 can also include a slump sensor 210 (not shown in FIG. 2, but in FIG. 3) that detects the slump of the payload. Slump indicates the fluidity (e.g., viscosity) of concrete in the drum 28. Slump sensing and sensors are known. Slump sensor 210 can be hydraulic and/or electric sensors or other known sensors for measuring the energy, torque, or the like for turning the mixing drum, speed sensor for measuring the speed of rotation, temperature sensors for monitoring the atmospheric temperature as well as the mix temperature, and dispensing equipment, as well as the computer processing units for receiving and processing the signals from such sensors to determine a value analogous to the slump of the concrete in drum. Examples of such slump detectors are disclosed in U.S. Pat. Nos. 5,713,663; 6,484,079; and 6,611,755 of Coffee. These teachings are incorporated herein by reference.

The slump data can be used alone or in conjunction with other data. In one embodiment, slump data alone can be used by the controller to start/set/control/adjust/stop drum rotational speed to reduce or eliminate spillage. For example, a certain slump reading could cause the controller 140 to increase the drum rotational speed. And as noted, the controller could use slump data along with other data such as an incline angle sensed by incline sensor 190. For example, when slump is at a particular level and truck 110 is going up a hill (or is parked on a hill with the front of truck 110 facing uphill) and therefore inclined, spillage of concrete from drum can result. As a similar example, if slump remains constant and the incline of the hill increases, spillage can result. As another example, if the incline of the hill remains constant (e.g., truck 110 is parked on a hill) and the slump increases, then spillage can result. As one example, when a change in incline and/or slump is sensed by inclinometer 190 and/or slump sensor 210 that could result in spillage (or increased spillage), then the programming within controller 140 could cause the rotational speed of the drum (in charge direction) to increase to prevent or reduce spillage, i.e., discharge or loss of concrete from drum 28. As another example, when incline sensor 190 indicates that truck 110 is inclined oppositely, such as when it is traveling down a hill (or is parked on a hill with the front of truck 110 facing downhill), then the drum speed can be decreased or even stopped.

In another embodiment, an accelerometer 195 (or a plurality of accelerometers) can be used to detect/measure changes in speed including changes in acceleration. Data relating to speed or acceleration change can be used by the controller to change aspects of the truck properties, like those noted herein. For example, when the speed of the truck increases, the greater potential spillage or unintentional discharge can be countered by the controller causing the drum rotational speed to increase. As another example, when the speed of truck 10, 110 decreases, the controller 140 can cause the drum rotational speed to decrease to, for example, reduce the wear on the drum-related components, reduce fuel usage/cost, reduce the flow of concrete within the drum toward the front of the drum (i.e., to have further control of the movement of the concrete within the drum), or reduce the number of mixing revolutions (i.e. load life). Alternatively, the controller can cause the drum rotational direction to change, for example, to provide one or more of the above effects. And similarly, the accelerometer can be used to sense changes in direction and the signals associated with this sensed changed that are received by the controller can be used similarly to affect one or more of the truck properties including drum rotational speed, drum rotational direction, and the like. In some embodiments, the controller 140 is configured to detect, measure, and/or count the number of revolutions the drum makes. After a predetermined number of revolutions, the controller 140 can change the rotational speed of the drum. For example, when mixing concrete in the drum, it may be desirable to initially rotate the drum at a high RPM (e.g., 12 RPM) and reduce the RPM (e.g., 6 RPM) after a certain number of revolutions (e.g., 75 in some embodiments). In some embodiments, the controller 140 is configured to detect that the truck is in motion (e.g., after releasing a parking brake, engaging drive, detecting truck acceleration) and change the rotational speed of the drum. As said above in connection with the incline sensor 190, instead of or in addition to a physical acceleration sensor, the controller 140 might fetch a variety of data from the truck network from which acceleration of the truck can be determined indirectly with some mathematical algorithms.

The rotation speed and rotation direction of a drum of a concrete mixing truck influences the position of the center of gravity of the truck and therefore the truck stability while the truck is driving. When the center of gravity of a truck changes to the wrong side while the truck is driving in a curve, the change of the center of gravity increases the risk that the truck is tipping. Also, quick changes of the drum rotational speed, while the truck is driving with high speed on a road, can influence the driving stability of the truck. For this reason, wheel sensors and/or a GPS sensor or any other suitable sensor might be used to detect the driving state of the truck (e.g., speed, direction change) and this data can be used to delay and/or stop changes in the rotational speed of the drum. In cases where a change of rotational speed of the drum will have a positive effect on the driving stability, because the center of gravity of the truck is going into a direction supporting the truck stability, the change of the drum revolutions will be allowed. Further data from an inclinometer can be used to measure the inclination of the truck relative to its sides and the data from this additional inclination sensor can be used to start/stop and/or increase/decrease the rotational speed of the drum.

Changes to the rotational speed of the drum while the truck is in motion should occur smoothly. The rate of change can depend on the vehicle speed. For example, changes to rotational speed of the drum might be low at a high vehicle speed but faster at a lower vehicle speed (e.g., when the truck is climbing up a hill with low speed). In some embodiments, a faster change of rotational speed can be allowed to avoid spillage, without compromising stability of the truck. In some embodiments, the truck includes a warning system to provide a driver of the truck an opportunity to manually override an automatic change of the rotational speed of the drum. For example, the warning system can include an optical or acoustic warning signal that is initiated before the rotational speed change so that the driver is aware that the center of gravity of the truck will change and give the driver an opportunity to stop the automatic drum speed change by pressing a control button or calling out a stop signal, which could be received by a voice recognition unit.

In some embodiments, truck 10, 110 also includes proximity sensors, such as RFID sensors and the like. An RFID sensor, for example, can be configured to communicate with other proximity sensors. For example, a truck-mounted RFID sensor can be configured to communicate with another RFID sensor positioned at a batch plant. If the truck-mounted RFID sensor detects that the truck is at a position at the batch plant where it is logical to change the rotational speed of the rotating drum (e.g., turning off the rotational drum to save fuel), the truck-mounted RFID sensor can communicate with controller 140, which effects such change in rotational speed. In some embodiments, the truck 10, 110 includes a warning system to provide a driver of the truck an opportunity to manually override an automatic change of the rotational speed of the drum. For example, the warning system can include an optical or acoustic warning signal that is initiated before the rotational speed change so that the driver is given an opportunity to stop the automatic drum speed change by pressing a control button, etc.

Different combinations or permutations of sensed data, including data relating to slump, front-back incline, side-to-side incline, speed or acceleration changes, and other data disclosed herein can be used to reduce spillage, save fuel, reduce wear, extend load life, and/or accomplish or contribute to other objectives disclosed herein.

Truck 10 or 110, using the controller 140, can be used to carry out a particular mix and load function that reduces fuel consumption/cost. One approach or embodiment to carry out this function is for the operator to push the load function on one of the previously described user interface devices, such as devices 160, 170, which causes the controller to cause truck idle to change such that drum rotational speed increases but not to maximum drum speed. The increase in drum speed could be, for example, 2 rpms. This change can be a way of making the operator aware that an operation relating to the truck is occurring or about to occur. With this approach, when the addition of concrete to the drum is sensed by, for example, an increased demand on the hydraulic system, e.g., hydraulic pressure increase, then the controller 140 can be configured to cause the drum speed to increase to a higher speed, such as maximum speed, or to alert an operator to increase the drum speed.

Also, the control system, for example controller 140, can receive data relating to slump/hydraulic pressure to establish a baseline and can later receive data relating to a pressure increase (slump/hydraulic), which can effectively mimic the batch sequence starting. The control system can then turn the drum rpm to a specific setting and can cause the truck throttle rpm to change such that a different drum rpm is achieved. This can result in a fuel savings because the truck rpm setting will be variable based on rpm requirements of the drum, and the truck would not need to sit under the batch plant at full rpm waiting for the batch plant to start loading the truck. The operator has the ability to override this auto-load function if desired to control truck and mixer drum rpm. In addition to saving fuel, there is potential to save drum revolutions, decrease drum wear (fewer revolutions), decreased revolutions on gearbox and hydraulic system, potential savings on wear-and-tear on truck suspension components. The reduced component wear should reduce maintenance intervals saving the mixer operation maintenance costs on parts and labor.

Figure 3:
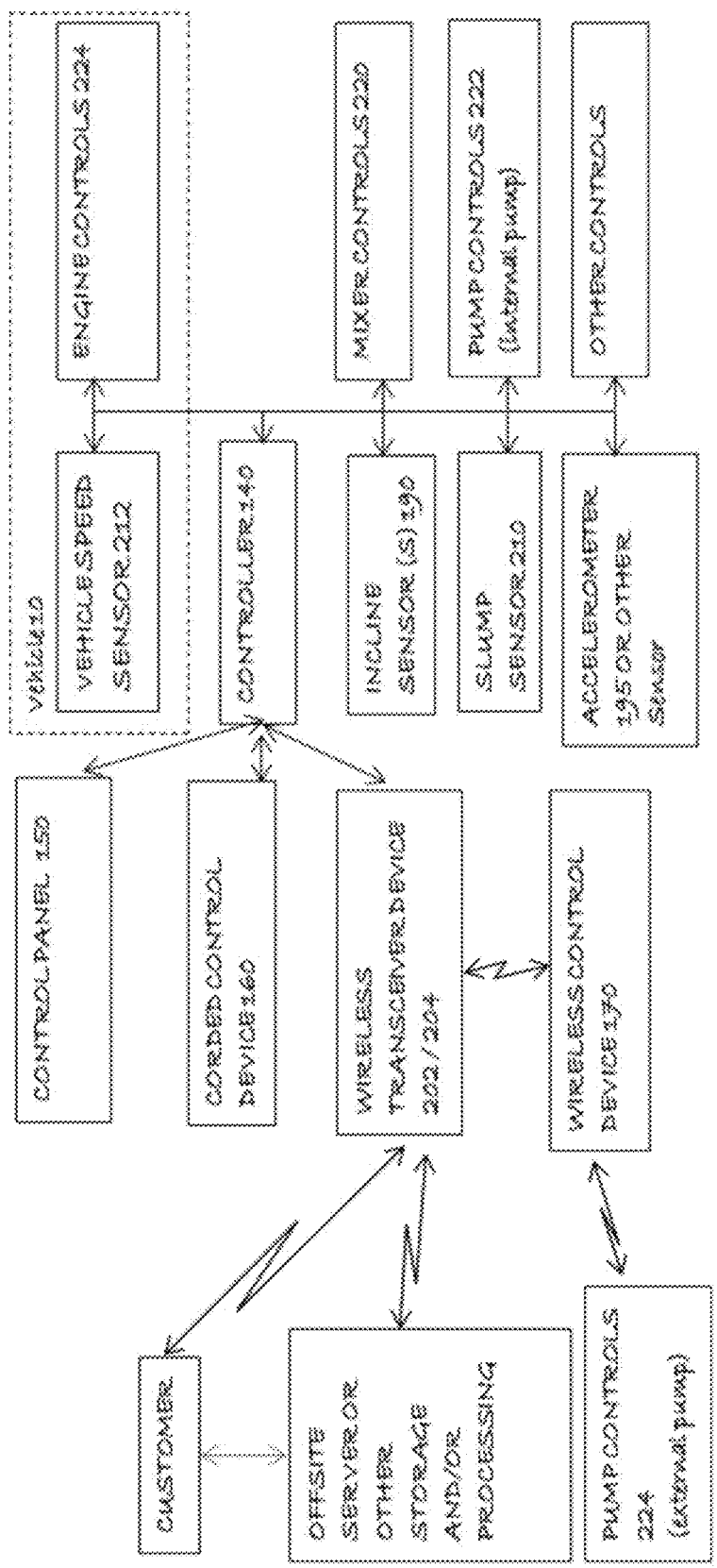
FIG. 3 is a block diagram of an embodiment of a system of control components of a concrete mixer truck.

FIG. 3 is a block diagram showing one embodiment with several components and communication, control and/or use pathways, approaches or methods for a mixer truck such as truck 10, 110 or another truck. This is an exemplary diagram, which like the other illustrations and textual descriptions, is to be taken to also disclose embodiments with fewer or more than the shown components, pathways, approaches and methods. That is, variations or modifications to the embodiment shown in FIG. 3 are envisioned, including different combinations or permutations of some or all of the items noted in this embodiment. As shown, this embodiment includes controller 140 in communication with several components including three communication and/or control devices (i.e., control panel 150, corded control device 160, wireless control device 170), incline sensor(s) 190, accelerometer(s) 195, slump sensor 210, engine speed sensor 212, other sensors, mixer controls 220, engine controls 224, pump controls 222, other controls (with controls meaning control devices, controllers or other control hardware, programming, etc. As previously noted, the controller can also access information from the truck mixer J1939 network and/or the ECU (Electronic Control Unit) of the truck to determine e.g. vehicle speed (in place of or in addition to vehicle speed sensor 212) and can be linked with the mixer control system. This figure provides multiple approaches or methods for making use of the devices and methods described herein.

FIG. 3 also shows a wireless transceiver 202/204 connected to controller 140 that communicates with one, more or all the noted devices, particularly cordless devices such as wireless control device 170. As explained above, a wireless shorter range transceiver 202 is integrated with a wireless long range transceiver 204 which can communicate as well with a customer and offsite data storage and/or processing equipment such as offsite servers. Transceivers 202, 204 can be implemented while being separated from each other. Wireless transceivers 202, 204 can also be integrated with or into the controller 140.

Constant drum speed can be provided to truck 10, 110 using the approach disclosed in U.S. Pat. No. 7,722,243. Alternatively, it can be provided at any and all times when using the embodiments noted herein regardless of vehicle speed. For example, the constant drum speed can be set and/or maintained based on data (signal) from a speed sensor that senses the speed of one or more gears of the gearbox. For example, the gear speed sensor can be used to count the gear teeth moving past a particular point within a particular period of time to determine the speed of the gear and the controller can be configured to use the teeth per unit time and establish the drum speed with a formula or algorithm that correlates the teeth per unit time for a particular gear with the rotational speed of the drum. Other structures than the teeth can be used with this method such counting the rotations of a driveshaft, belt or other component that is connected to and moving in correlation with the drum. This method can be used in place of other methods that sensing a different property, such as hydraulic pressure, that can be used to correlate to drum speed but with or potentially with lesser accuracy. The controller 140 can receive readings or data from the drum speed sensor and can use a mathematical formula to calculate or correlate to the drum rotational speed to turn the drum at a drum rpm setting requested by the operator. For example, if the operator sets the required drum rpm to 3, 4, 5, 6, etc., rpms the drum will automatically turn at that setting regardless of a vehicle threshold speed. In the event of a loss, failure or malfunction of the drum speed sensor, truck 110 is configured to permit the operator to manually adjust charge/discharge and generally have control over the mixer. This approach or method remains effective even with wear in the hydraulic system that involves for example internal leakage of hydraulic fluid because the drum speed determination is not based on a hydraulic measurement such as hydraulic pressure or oil flow, but is based on a more direct method of determining drum speed (i.e., gear speed with the appropriate gear-based formula to equate to drum speed).

FIG. 4 shows one embodiment, which is a view of the control panel 150 with display 152 and softkeys 154. The upper three softkeys on the left side are enabled to control the booster axle of the mixer truck. A further softkey on the left side is used for controlling e.g. the worklight at the rear of the truck mixer and one more softkey on the left side controls a camera, which might be a rear view camera, so that the rear of the truck is shown on the display when the truck is moving backwards. The upper softkey on the right side can be used for opening a menu for controlling the rpm of the mixing drum, while the two softkeys below this key are arranged to change the drum rotation direction. Another drum counter softkey is used to check the number of drum rotation, e.g. since the last drum service. An additional joystick/mouse control is used to select items on the display. Various similar embodiments can involve fewer or more functionalities and fewer or more softkeys, or can involve the use of keys other than softkeys or, as previously noted, the use of a touchscreen. All of the above structures can provide means for selecting turning on or off or adjusting a functionality, effect, setting or other aspect.

Besides the softkey functionalities disclosed above, the display 152 shows status information of the truck and the mixing system. In FIG. 4 the display 152, for example, shows whether or not the constant drum speed feature is enabled, whether or not the drum discharges, the booster axle pressure on the ground and the current number of drum rotations per minute. Other status data might be shown in other menu instances.

While embodiments and aspects of those embodiments of the subject matter herein are described with specificity, the description itself is not intended to limit the scope of this disclosure. Thus, the inventors have contemplated that the subject matter described herein might also be embodied in other ways, to include different steps or features, or combinations or permutations of structures, aspects, means, components steps or features described or similar to those described herein.

We claim:

1. A concrete mixing system comprising:
    a vehicle having a vehicle front portion and a vehicle rear portion;
    a rotatable mixing drum coupled to the vehicle and having a drum first end portion and drum second end portion, wherein the drum first end portion has a discharge opening to permit discharge of concrete at a work site;
    an incline sensor configured to sense an indication of an incline or decline of the vehicle front portion relative to the vehicle rear portion;
    a slump sensor configured to detect slump of concrete in the rotatable mixing drum; and
    a controller configured to (1) receive a signal from the incline sensor corresponding to the decline of the vehicle front portion relative to the vehicle rear portion, (2) receive a signal corresponding to the sensed slump from the slump sensor, and (3) reduce rotational speed of the drum in response to the signal from the incline sensor indicating a decline and the signal from the slump sensor.

2. The concrete mixing system of claim 1, wherein the incline sensor comprises one of an inclinometer, altimeter, and GPS device.

3. The concrete mixing system of claim 1, wherein the controller comprises at least one of a programmable logic controller and a computer.

4. The concrete mixing system of claim 1, wherein the controller is configured to increase the rotational speed of the rotatable mixing drum in a charge rotational direction when the sensed incline of the vehicle front relative to the vehicle rear portion exceeds a set amount.

5. The concrete mixing system of claim 1, further comprising:
    at least a third sensor configured to detect an aspect of at least one of the vehicle and the concrete in the rotatable mixing drum other than incline or slump, and
    wherein the controller is configured to change the rotational speed of the rotatable mixing drum in response to signals from the incline sensor, slump sensor, and the third sensor.

6. The concrete mixing system of claim 5, wherein the third sensor is one of a drum speed sensor, vehicle speed sensor, acceleration sensor, position sensor, GPS sensor, RFID sensor, and pressure sensor.

7. The concrete mixing system of claim 6, wherein the controller is further configured to effect an increase in the rotational speed of the rotatable mixing drum in response to receiving an indication of increased vehicle speed from the vehicle speed sensor or the acceleration sensor.

8. The concrete mixing system of claim 6, wherein the controller is further configured to effect a change in rotational direction of the rotatable mixing drum in response to receiving an indication of increased vehicle speed from the vehicle speed sensor or the acceleration sensor.

9. A concrete mixing system comprising:
    a vehicle having a vehicle front portion and a vehicle rear portion;
    a rotatable mixing drum coupled to the vehicle and having a drum first end portion and drum second end portion, wherein the drum first end portion has a discharge opening to permit discharge of concrete at a work site;
    an incline sensor configured to sense an indication of an incline or decline of the vehicle front portion relative to the vehicle rear portion; and
    a controller configured to receive a signal from the incline sensor corresponding to the incline or decline and reduce rotational speed of the drum in response to the signal from the incline sensor indicating a decline.

10. The concrete mixing system of claim 9, wherein the incline sensor comprises one of an inclinometer, altimeter, and GPS device.

11. The concrete mixing system of claim 9, wherein the controller comprises at least one of a programmable logic controller and a computer.

12. The concrete mixing system of claim 9, wherein the controller is further configured to effect an increase in the rotational speed of the rotatable mixing drum in response to receiving an indication of increased vehicle speed from a sensor.

13. The concrete mixing system of claim 9, wherein the controller is further configured to effect a change in rotational direction of the rotatable mixing drum in response to receiving an indication of increased vehicle speed from a sensor.

14. The concrete mixing system of claim 9, wherein the controller is further configured to increase the rotation speed of the drum in response to the signal from the incline sensor indicating an incline.

* * * * *